United States Patent Office 3,055,807
Patented Sept. 25, 1962

3,055,807
PROCESS FOR PRODUCING ANTIBIOTIC
Vladimir Prelog and Ernst Gaeumann, Zurich, and Albert Wettstein, Basel, Switzerland, assignors to Ciba Corporation, a corporation of Delaware
No Drawing. Filed Mar. 13, 1957, Ser. No. 645,872
Claims priority application Switzerland Mar. 28, 1956
2 Claims. (Cl. 195—80)

This invention relates to a new antibiotic, which is hereinafter referred to as "echinomycin," derivatives and fission products thereof, pharmaceutical preparations containing these compounds, and a process for the manufacture of these substances and mixtures thereof.

The antibiotic echinomycin is obtained by the culture of a new species of actinomycetes of the genus Streptomyces, which is not identical with any of the species mentioned in Bergey's "Manual of Determinative Bacteriology," 6th edition, or in "Actinomycetes and Their Antibiotics" of Waksman and Lechevalier, 1953. The new species is hereinafter referred to as *Streptomyces echinatus* nov. sp. It was isolated from a sample of soil collected in Angola. A sample has been deposited in the Eidg. Technischen Hochschule, Institut für spezielle Botanik, Zürich, Switzerland, under the identification Number A. 8331. A further sample has been sent to the Culture Collection, Unit Fermentation Section, Peoria, Ill., and has been assigned the number NRRL 2587.

*Streptomyces echinatus* forms an ash grey mycelium in the air. It has conidial chains, which are a typical feature of the genus Streptomyces. The spores are elliptical to oval. Their surface is covered with long thin spines, and their size is $0.9\mu$ x $0.6$–$0.7\mu$. Its growth is relatively little dependent on temperature, and it develops well at 18° C. as well as 40° C., but the optimum is within the range of 25–32° C.

For the purpose of further characterisation there is described below the growth of *Streptomyces echinatus* on various nutrient media. Nutrient media Nos. (1) to (8) and (12) were prepared as described by W. Lindenbein, Arch. Mikrobiol., vol. 17, page 361 (1952).

(1) Synthetic agar: Growth thin, cloudy, greenish yellow or lemon yellow to leek-green; air mycelium is velvety, snow white after 4 days, and lemon yellow after 7 days; pigment is greenish yellow to grass green after 14 days.

(2) Synthetic solution: Growth sparse, fine turbidity.

(3) Glucose liquor: Floating growth is point-like and pale brown; no pigment.

(4) Glucose-agar: Substratum mycelium is wrinkled, egg yolk yellow; air mycelium is velvety, snow white at the centre, brownish yellow at the edges after 4 days, woolly, grey-white to ash grey after 7 days; pigment is a deep yellow to golden yellow.

(5) Glucose-asparagin-agar: Substratum mycelium is thin, smooth golden yellow to greenish yellow, and after 7 days also greenish grey; air mycelium is velvety, from the top to the bottom in the test tube it is ash-grey, reddish violet, and, after 4 days, white grey, and after 7 days it is ash-grey over the whole length of the inclined surface of the agar; no distinct pigment.

(6) Calcium mallate-agar: Growth is thin, cloudy, pale yellow after 4 days, and greenish yellow after 7 days; the air mycelium is dusty milk-white to pale yellow; no pigment.

(7) Gelatine stab culture at 18° C.: Growth is superficial, thin and dark brown; the air mycelium is velvety and greenish grey after 14 days; pigment is dark brown; there is no liquefaction after 31 days.

(8) Starch plate: Growth is pustular and deep yellow; air mycelium is velvety and ash-grey; there is no or at most a trace of hydrolysis after 5 days.

(9) Nutrient agar: Growth is point-like and pale yellow; it forms no air mycelium; no pigment.

(10) Potatoes: Substratum mycelium is lichen-like, greenish to raven-black; air mycelium is sparse, dusty and white grey after 4 days, and grey-blue after 7 days; substratum is coloured brownish pitch black.

(11) Carrots: Growth is thin and pale yellow; air mycelium is dusty and white grey after 4 days, and greenish grey after 7 days; no diffusible pigment.

(12) Litmus milk: Ring growth and covering; air mycelium is dusty and white grey to ash grey; coagulation and peptonisation after 5 days, complete after 12 days.

When tested by the method of T. G. Pridham and D. Gottlieb, J. Bacteriology, vol. 56, page 107 (1948), *Streptomyces echinatus* grows in the following manner when various sources of carbon are used:

| | | | |
|---|---|---|---|
| L-xylose | + | Inulin | − |
| L-arabinose | + | D-mannitol | + |
| L-rhamnose | + | D-sorbitol | − |
| D-fructose | + | Dulcitol | − |
| D-galactose | + | Mesoinositol | + |
| Saccharose | − | Salicin | − |
| Maltose | + | Sodium acetate | + |
| Lactose | + | Sodium citrate | − |
| Raffinose | + | Sodium succinate | + |

The symbols mean:
+ good growth, and the source of carbon was used with certainty
(+) weak growth, and consumption of the carbon source being questionable
(−) very weak growth, and consumption of the carbon source improbable
− no growth, and no consumption of the carbon source.

*Streptomyces echinatus* exhibits certain resemblances to *S. griseoflavus* (Krainsky), Waksman et Henrici, and to *S. flaveolus* (Waksman), Waksman et Henrici, both of which have an ash-grey air mycelium and spores having processes. In the case of *S. flaveolus* these processes, according to T. R. Vetnon [Nature, vol. 176, page 935 (1955)], consist, however, of hairs up to $1\mu$ in length. On the other hand, *S. griseoflavus* has on its spores spines of a maximum length of $0.2\mu$, that is to say, considerably shorter than those of *S. echinatus*. Furthermore, *S. griseoflavus* has no yellow pigment and completely liquefies gelatine and hydrolyses starch to a medium extent.

The invention, insofar as it relates to the production of the antibiotic echinomycin, is not limited to the use of *Streptomyces echinatus* or other strains corresponding to the description of the latter, but extends also to the use of variants of these organisms such as are obtainable, for example, by selection or mutation, especially under the action of ultraviolet rays or X-rays or nitrogen mustard oils.

For producing the antibiotic echinomycin a strain of Streptomycetes exhibiting the properties of *Streptomyces echinatus* is aerobically cultured, for example, in a nutrient aqueous solution containing inorganic salts, nitrogenous compounds and, if desired, carbohydrates, until the solution exhibits a substantial anti-bacterial activity, and the antibiotic echinomycin is then isolated therefrom.

The nutrient solution may contain as inorganic salts, for example, chlorides, nitrates, carbonates, sulfates of alkali metals, alkaline earth metals, magnesium, iron, zinc or manganese. As nitrogenous compounds and carbohydrates, which may be added if desired, and growth promoting substances there may be mentioned, for example, aminoacids and mixtures thereof, peptides and proteins including their hydrolysates, such as peptone or tryptone, meat extracts, water-soluble constituents of cereal grains such as maize or wheat, of distillation radicals obtained in the manufacture of alcohols, of yeasts, beans especially those of soya bean plants, or of seeds, for example, seeds of cotton plants, and also glucose, saccharose, lactose or starches.

The aerobic culture is carried out, for example, in a quiescent surface culture or advantageously in a submerged culture with agitation or stirring in the presence of air or oxygen in shaking flasks or the known fermenters. A suitable temperature is within the range of 18–40° C. The nutrient solution generally exhibits a substantial antibacterial activity after 1½ to 5 days.

For isolating the antibiotic there may be used, for example, the following method: The mycelium is separated from the culture filtrate, and the greater part of the antibiotic is present in the culture filtrate. However, appreciable quantities of the antibiotic remains absorbed on the mycelium. It is therefore advantageous to wash the mycelium well. For this purpose there are especially suitable organic and at least partially water-soluble solvents such as alcohols, for example, methanol, ethanol or a butanol, or ketones, for example, acetone or methyl ethyl ketone. The mycelial extracts are added either directly or after preliminary concentration in vacuo to the culture filtrate. The mixture is extracted with an organic solvent immiscible with water, such as an ester of a lower fatty acid, for example, ethyl acetate or amyl acetate, a hydrocarbon, for example, benzene, or a chlorinated hydrocarbon, for example, ethylene chloride, methylene chloride or chloroform, or a ketone, for example, methyl propyl ketone, methyl amyl ketone or diisobutylketone, or an alcohol such as a butyl alcohol or an amyl alcohol, an ether, for example, ethyl ether, diisopropyl ether, a dibutyl ether, or a glycol ether or the like. Instead of subjecting the culture to extraction with a solvent, or in addition to such an extraction as a further purification step, the antibiotic may be obtained by adsorption, for example, on active carbon or an activated earth, such as fuller's earth, followed by extraction of the adsorbate, for example, with an organic solvent at least partially soluble in water, such as acetone, butanol or methyl ethyl ketone.

Alternatively, the cultures may be extracted in the manner described above directly, that is to say, without first separating the mycelium.

A further method of concentrating the antibiotic is first to extract the organic extracts containing the antibiotic with an aqueous acid solution having a pH value below 5 and then with an aqueous alkaline solution having a pH value above 8, whereby the greater part of the antibiotic activity remains in the organic phase, from which the echinomycin is isolated. A small amount of activity is present in the alkaline aqueous extracts, from which an antibiotically active organic acid can be recovered by extraction with the above-mentioned organic solvents at a pH value below 5. As acid aqueous solutions there may be used dilute acids, such as acetic acid, hydrochloric acid or sulfuric acid, or buffer solutions such as citrate or phosphate buffers, and as alkaline aqueous solutions there may be used dilute alkalies, such as caustic soda solution or caustic potash solution, or buffer solutions such as phosphate buffers, and the like.

A good method of purifying the new antibiotic is to bring about distribution between an aqueous alcoholic solution and a solvent immiscible with water. Advantageously, the distribution is carried out by the countercurrent method in a suitable apparatus, e.g. that of Craig. Chromatography is also very useful for carrying out the purification. The pure antibiotic can be recovered in crystalline form, for example, from an organic solvent, such as acetone, methanol, ethanol, chloroform, mixtures of acetone and methanol, mixtures of acetone and ether or mixtures of acetone and petroleum ether. For recrystallization the same solvents may be used or aqueous organic solvents, such as dilute alcohols, dilute acetone, etc.

The antibiotic is obtained in the form of a colorless microcrystalline powder melting at 217–218° C. and having the specific rotation $[\alpha]_D = -310°$ (chloroform). It is easily soluble in chloroform, acetone, ethyl acetate, less soluble in lower alkanols, e.g. ethanol, and practically insoluble in ether, water and petrol ether. Elemental analysis of the product gives the following results: C=55.79%, H=5.74%, N=15.20%, S=5.24%, (N)CH$_3$=5.20%, (C)CH$_3$=2.63%. These values suggest the formula $C_{29}H_{37}O_7N_7S$, in which case the substance would contain no O-methyl groups, but 2 N-methyl groups and 2 C-methyl groups. Its ultraviolet absorption spectrum exhibits two bands at 242 mμ

$$(\log E^{1\%}_{1\,cm.} = 2.76)$$

and at 322 mμ

$$(\log E^{1\%}_{1\,cm.} = 2.02)$$

In the infra-red spectrum, a drawing of which is accompanying the application, bands are visible at, inter alia, the following wavelengths: 5.74μ, 6.00μ, 6.81μ, 7.06μ, 7.22μ, 7.85–8.00μ (very wide band), 8.75μ, 9.06μ, 12.78μ and 13.16μ. Echinomycin has no basic properties and no hydroxyl groups capable of being easily acylated.

When echinomycin is subjected to acid hydrolysis there are obtained the amino-acids D-serine and L-alanine, and also further fission products, which give a positive color reaction with ninhydrin. On the other hand, mild treatment of echinomycin with an alkali yields an acid hydrolysis product, namely "echinomycin acid." Its ultraviolet absorption spectrum exhibits two bands at 242 mμ

$$(\log E^{1\%}_{1\,cm.} = 2.83)$$

and at 322 mμ

$$(\log E^{1\%}_{1\,cm.} = 2.11)$$

Upon acid hydrolysis of this acid there is formed, inter alia, alanine, but no serine. On being boiled with concentrated caustic soda solution, echinomycin splits off about 1.2 mols of ammonia, whilst quinoxaline carboxylic acid-(2) can be isolated from the alkaline reaction mixture after acidification and extraction with ethyl acetate. According to these experiments, echinomycin is obviously a compound having a structure like a peptide in which, in addition to L-alanine, D-serine, quinoxaline-2-carboxylic acid and ammonia probably bound in amide-like manner, a trivalent radical $C_{14}H_{21}O_3N_2S$ is present.

The antibiotic echinomycin has a very high antibiotic action against various test organisms. By using as test methods in vitro glucose broth at various dilutions (to the power of 10) with an incubation period of 24 hours at 37° C., the following concentrations at which bacterial growth was checked, were obtained:

| Test organism | Growth inhibiting concentration, μg./cm.³ |
|---|---|
| *Micrococcus pyogenes*, var. *aureus* | 0.1 |
| *Micrococcus pyogenes*, var. *aureus* Penicillin-resistant | 0.1 |
| *Streptococcus pyogenes* | 0.1 |
| *Streptococcus viridans* | 0.1 |
| *Streptococcus faecalis* | 1 |
| *Corynebacterium diphtheriae* | 0.1 |
| *Vibrio cholerea* El Tor | 100 |
| *Bacillus megaterium* | 10 |
| *Candida vulgaris* | 100 |
| *Mycobacterium tuberculosis* [1] | 100 |
| *Entamoeba histolytica* [2] | 1,000 |
| *Trichomonas foetus* [3] | <4 |

[1] Cultivated in Kirchner's synthetic medium containing 5% of bovine albumin; reading of the growth taken after two weeks.
[2] A culture in Bacto-Entamoeba medium (DIFCO, England); reading of the amoebicidal action taken after 24 hours.
[3] Cultivated in glucose broth containing 10% of horse serum at 37° C.; reading taken after 4 days.

The development of influenza virus on isolated membranes of the chorioallantois of hens eggs incubated for 14 days is inhibited at a concentration of less than 1μ gram per square centimeter, and the chorioallantois tissue is not toxically injured by a concentration of 100μ grams per square centimeter.

The antibiotic echinomycin is also active in vivo.

When this product is administered subcutaneously five times at the rate of 5 milligrams per kilogram of body weight to mice infected with streptococcus the exitus is retarded two days. When mice are given a subcutaneous administration of 1 milligram per kilogram of body weight a 100 percent suppression of infections with *Borrelia recurrentis* is observed. Moreover, in the case of rats infected with amoebae an oral administration of 5 milligrams per kilogram of body weight is 100 percent effective.

The local application of a solution of echinomycin of 1 percent strength to hamsters, which are vaginally infected with *Trichomonas foetus* has a good curative action.

The invention also provides, apart from the aforesaid compound itself, conversion products thereof obtained by hydrogenation or oxidation, and also fission products thereof such, for example, as are obtained by hydrolysis of the antibiotic echinomycin.

The antibiotic echinomycin, the aforesaid conversion and fission products thereof, and also mixtures of these substances, can be used as medicaments, for example, in the form of pharmaceutical preparations. These preparations contain the aforesaid substances in admixture with a pharmaceutical organic or inorganic carrier material suitable for enteral, parenteral or local administration. As such carrier materials there are used materials which do not react with the new substances, for example, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be made up, for example, in the form of tablets, dragees, powders, salves, creams, suppositories, or in liquid form as solutions, suspensions or emulsions. If desired they may be sterilised and/or may contain auxiliary substances, such as preserving, stabilising, wetting or emulsifying agents. They may also contain other therapeutically valuable substances.

The following examples illustrate the invention:

*Example 1*

A nutrient solution is prepared as follows: 20 grams of soya bean meal, 20 grams of mannitol and 1 liter of tap water are mixed together and adjusted to a pH value of 7–8. The resulting solution, or several times the quantity thereof, is charged into Erlenmeyer flasks of 500 cc. capacity (each with 100 cc. of nutrient solution) or into fermenters of 500 liters capacity (each with 300 liters of nutrient solution), and the solutions are sterilized for 20–30 minutes under 1 atmosphere gauge pressure. The solutions are then inoculated with up to 10 percent of a partially sporulating vegetative culture of *Streptomyces echinatus*, and incubated while agitating or stirring well and, in the case of the fermenters, with aeration (with about one volume of sterile air per part by volume of nutrient solution per minute) at 27° C. After 70–120 hours of growth the cultures are filtered with the addition of a filtering assistant through a suction filter or a filter press or a rotating filter, depending on the volume of the culture in question, and the antibiotically active aqueous solution is thus freed from mycelium and other solid constituents.

*Example 2*

By using, instead of the nutrient medium described in Example 1, any one of the following nutrient solutions (*a*), (*b*), (*c*) and (*d*), there are obtained after similar sterilization, inoculation with *Streptomyces echinatus*, incubation at 27° C. and filtration, antibiotically active aqueous solutions.

(*a*) 10 grams of crude glucose, 5 grams of peptone, 3 grams of meat extract (Oxo Lab Lemco), 5 grams of sodium chloride, 10 grams of calcium carbonate and 1 liter of tap water; pH value before sterilization=7.5.

(*b*) 10 grams of crude glucose, 10 grams of distillers solubles, 1 gram of sodium nitrate, 5 grams of sodium chloride, 10 grams of calcium carbonate and 1 liter of tap water; pH value before sterilization=7.5.

(*c*) 10 grams of crude glucose, 20 cc. of corn steep liquor, 2 grams of secondary potassium hydrophosphate and 1 liter of tap water; pH value before sterilization=7.5.

(*d*) 20 grams of glycerine, 10 grams of soya bean meal, 5 grams of sodium chloride, 1 gram of sodium nitrate, 10 grams of calcium carbonate and 1 liter of tap water; pH value before sterilization=7.5.

*Example 3*

The filter residue from a 150 liter batch obtained as described in Example 1 or 2 is stirred with 25 liters of acetone and filtered. This is repeated twice, and then the acetone solutions containing the antibiotic are combined and concentrated in vacuo to 5 liters, and then combined with the culture filtrate. The resulting solution is extracted with 70 liters of ethyl acetate in a Westfalia extractor, whereupon the whole of the antibacterial activity passes into the organic phase. The extract is washed with water, evaporated in vacuo to 5 liters and then agitated several times with 0.5 N-acetic acid and with 2 N-caustic soda solution. The ethyl acetate solution is finally dried over sodium sulphate and evaporated in vacuo, whereby an oily residue to obtained. By treating the latter with petroleum ether the crude antibiotic echinomycin is obtained in the form of yellowish flocks.

The above-mentioned caustic soda extracts possess a weak antibiotic activity. They are adjusted with dilute hydrochloric acid to a pH value of 3 and extracted with ethyl acetate. The extracts are washed with water, dried and evaporated in vacuo. The yellow amorphous residue is antibiotically active.

*Example 4*

5.7 grams of the crude antibiotic echinomycin obtained as described in Example 3 are subjected to an 82-stage counter-current distribution with a solvent mixture of 2.63 parts by volume of carbon tetrachloride, 0.37 part by volume of chloroform, 2.4 parts by volume of methanol and 0.6 part by volume of water. After evaporating the contents of the several distribution vessels in vacuo at 30° C., the greater part of the substance and the activity is present in stage 35. Fractions Nos. 30–40 are combined and there are obtained therefrom 1.20 grams of paper chromatographically uniform echinomycin. The latter is recrystallized from methanol and is a colorless microcrystalline powder melting at 217–218° C., and having the specific rotation $[\alpha]_D = 310°$ (in chloroform). By analysis: C=55.79%, H=5.74%, N=15.20%, S=5.24%, (N)CH$_3$=5.20%, (C)CH$_3$=2.63% and active H=0.68%. Its ultra-violet absorption spectrum in absolute alcohol exhibits bands at 242 m$\mu$ $$(\log E_{1\ cm.}^{1\%} = 2.76)$$

and 322 m$\mu$ $$(\log E_{1\ cm.}^{1\%} = 2.02)$$

Its infra-red absorption spectrum in mineral oil exhibits bands inter alia at the following wavelengths: 5.74$\mu$, 6.00$\mu$, 6.81$\mu$, 7.06$\mu$, 7.22$\mu$, 7.85–8.00$\mu$ (very broad band), 8.75$\mu$, 9.06$\mu$, 12.78$\mu$ and 13.16$\mu$.

*Example 5*

5 grams of the crude antibiotic echinomycin obtained as described in Example 3 are chromatographed over a column of 150 grams of aluminum oxide (activity III) by fractional elution with benzene, chloroform, mixtures of chloroform and methanol, and methanol. The separate fractions (each of 400 cc.) are evaporated in vacuo and their antibiotic activity is tested. The benzene and chloroform fractions contain only inactive accompanying substances, whereas the portions eluted with mixtures of chloroform and methanol (99:1) are highly active. The latter are combined and crystallized from methanol. There are obtained 900 milligrams of echinomycin melting at 217–218° C., and having the specific rotation $[\alpha]_D = -310°$ (in chloroform).

Echinomycin can be used in the form of the following preparations for local application:
(a) 0.1% solution in a mixture of water and N-methylpyrrolidone (80:20 parts by volume).
(b) 0.1% solution in castor oil.
(c) 0.01% solution in arachis oil.

*Example 6*

A solution of 250 milligrams of echinomycin in 20 cc. of ethanol is mixed with a solution of 1 gram of potassium hydroxide in 30 cc. of ethanol, and the mixture is allowed to stand for 14 hours at 20° C. Water is then added and the solution is extracted several times with ethyl acetate. The extracts are washed with water, dried and evaporated, whereby 3 milligrams of starting material are obtained. The aqueous alkaline phase is acidified by the addition of dilute hydrochloric acid and extracted with ethyl acetate. After being washed with water and dried, the extracts are evaporated in vacuo. There are obtained 200 milligrams of colorless echinomycin acid. Its ultraviolet absorption spectrum exhibits bands at 242 mµ

$$(\log E_{1cm.}^{1\%} = 2.83)$$

and 322 mµ

$$(\log E_{1cm.}^{1\%} = 2.11)$$

20 milligrams of echinomycin acid are hydrolysed with 5 cc. of hydrochloric acid of 20 percent strength. By testing the hydrolysate by paper chromatography alanine and other ninhydrin-positive substances are found therein.

*Example 7*

500 mg. of echinomycin are heated in a mixture of 5 cc. of concentrated hydrochloric acid and 5 cc. of water in a sealed tube for 20 hours at 100° C. The black-green colored reaction solution is diluted with water and a little active charcoal is added. After filtration, the solution is evaporated in vacuo at 40° C., a brown residue being obtained. The latter is taken up again in 15 cc. of water. 500 mg. of sodium hydrogen carbonate are first added to this solution and then a solution of 500 mg. of 2,4-dinitrofluorobenzene in 30 cc. of alcohol. After being allowed to stand for 2 hours at room temperature, the solution is concentrated in vacuo to one quarter of its volume and then extracted with ether. The resulting aqueous phase is then acidified and again extracted with ether. From these extracts there is obtained after washing, drying and evaporating, a viscous oil which, when tested by paper-chromatography contains the 2,4-dinitrophenyl derivatives of serine and alanine. The product can be separated by distribution chromatography. For this purpose a column is prepared consisting of 40 grams of silicic acid which is triturated with 16 grams of water and then suspended with chloroform. The oil, dissolved in a little chloroform, is put on the column and elutriated first with a mixture of chloroform and butanol (99:1) and then with an analogous mixture in a ratio of 19:1, 2,4-dinitrophenyl-alanine or -serine respectively being separated. The latter crystallizes from a mixture of ether and petroleum ether in the form of yellow needles. It has a melting point of 175–176.5% C., and its optical rotation is $[\alpha]_D^{18} = +19°$ (c.=1.09 in acetone). It is therefore 2,4-dinitrophenyl-D-serine. The fraction containing 2,4-dinitrophenyl-alanine is purified by counter-current distribution between ether and a citrate-phosphate buffer according to MacIlvaine (pH 4.9). When distributed over 62 steps the substance maximum is in step 26. Steps 20–32 are combined, acidified and extracted with ether. After washing, drying and evaporating the extracts, a residue is obtained which crystallizes from a mixture of ether and petroleum ether. Melting point 173–176° C., and optical rotation $[\alpha]_D^{18} = -15.5°$ (c.=1.07 in acetone). It is therefore 2,4-dinitrophenyl-L-alanine.

*Example 8*

2 grams of echinomycin are heated slowly with a solution of 4 grams of sodium hydroxide in 35 cc. of water in a distilling flask and then heated to the boil; after distilling off about 30 cc. of the distillate, another 30 cc. of water are added to the flask and this quantity distilled off once again. The distillate is taken up in 50 cc. of 0.1 N-hydrochloric acid. The volatile portions passing over contain 1.2 mols of ammonia, which can be determined by titrating the contents of the receiver and by isolating ammonium chloride.

The alkaline distillation residue is taken up in 30 cc. of water, acidified with hydrochloric acid and extracted four times with ethyl acetate. The extracts are washed with water, dried and evaporated in vacuo. By recrystallization from ethyl acetate there are obtained from the extraction residue 410 mg. of quinoxaline-(2)-carboxylic acid in crystalline form. For further purification it is sublimed in high vacuum. Melting point: 212–213° C., equivalent weight 181, analysis: C, 62.07%; H, 3.47%; N, 16.09%.

The methyl ester formed by subjecting the quinoxaline-(2)-carboxylic acid to the action of diazomethane melts at 110–110.5° C. Analysis: C, 64.15%; H, 4.10%; N, 14.88%; OCH$_3$, 16.76%.

What is claimed is:
1. A method for producing the crystalline antibiotic substance echinomycin which comprises cultivating a strain of the species *S. echinatus* n. sp. NRRL 2587 in an aqueous nutrient medium containing a source of carbon and of nitrogen and inorganic salts under aerobic conditions at 18–40° C. until the nutrient medium exhibits a substantial antibacterial activity and then isolating the antibiotic echinomycin from the culture filtrate.

2. A method for producing the crystalline antibiotic substance echinomycin which comprises cultivating a strain of the species *S. echinatus* n. sp. NRRL 2587 in an aqueous nutrient medium containing a source of carbon and of nitrogen and inorganic salts under aerobic conditions at 18–40° C. until the nutrient medium exhibits a substantal antibacterial activity and then isolating the antibiotic echinomycin from the culture filtrate and subjecting it to mild alkaline hydrolysis and isolating echinomycin acid.

References Cited in the file of this patent

UNITED STATES PATENTS 2,649,401    Haines _____ Aug. 18, 1953

OTHER REFERENCES

Waksman et al.: "The Actinomycetes and Their Antibiotics," publ. 1953, pages 45–48, 171, 205–208, 220.
Baldacci Archives für Mikrobiologie, Bd 20, pages 347–357, 1954.
J. Antibiotics, vol. 8, 1955, pages 39–41.
Helvetica Chemica Acta, pages 199–210, vol. XL, 1957.
Sneath: J. Gen. Microbiol., 17: 184–200, August 1957.
Yamaguchi et al.: J. Gen. Appl. Microbiology 1: 3, 201–234, 1955.
Pridham et al.: Applied Microbiology, January 1958, pp. 52–79, vol, 6: 1, pp. 55, 65, 75 and 77 are esp. pert.
J. Antibiotics, vol. 11, No. 4, Ser. A, July 1958, pages 160–161.
J. Antibiotics, vol. 7, No. 4, Ser. A, p. 125, 1954.